US012316025B2

(12) United States Patent
Kim et al.

(10) Patent No.: US 12,316,025 B2
(45) Date of Patent: May 27, 2025

(54) ANTENNA STRUCTURE INCLUDING A PLURLAITY OF RADIATING PORTIONS

(71) Applicant: DONGWOO FINE-CHEM CO., LTD., Jeollabuk-do (KR)

(72) Inventors: Young Ju Kim, Gyeonggi-do (KR); Hee Jun Park, Gyeonggi-do (KR); Ho Dong Yoon, Gyeonggi-do (KR); Sung Jin Han, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 252 days.

(21) Appl. No.: 18/115,935

(22) Filed: Mar. 1, 2023

(65) Prior Publication Data

US 2023/0299483 A1 Sep. 21, 2023

(30) Foreign Application Priority Data

Mar. 15, 2022 (KR) ........................ 10-2022-0031974

(51) Int. Cl.
*H01Q 5/307* (2015.01)
*H01Q 5/50* (2015.01)

(52) U.S. Cl.
CPC ............... *H01Q 5/307* (2015.01); *H01Q 5/50* (2015.01)

(58) Field of Classification Search
CPC ........... H01Q 1/243; H01Q 1/38; H01Q 1/48; H01Q 5/307; H01Q 5/364; H01Q 5/50
See application file for complete search history.

(56) References Cited

U.S. PATENT DOCUMENTS

2020/0259240 A1 * 8/2020 Moallem .............. H01Q 9/0407
2023/0099558 A1 * 3/2023 Jung ...................... H01Q 5/385 343/713
2023/0101080 A1 * 3/2023 Lee ........................ H01Q 1/243 343/702

FOREIGN PATENT DOCUMENTS

JP 2008-219125 A 9/2008
KR 10-2019-0009232 A 1/2019

* cited by examiner

*Primary Examiner* — Raymond R Chai
(74) *Attorney, Agent, or Firm* — The PL Law Group, PLLC

(57) ABSTRACT

An antenna structure according to an embodiment includes a radiator including a plurality of radiating portions integrally connected to each other, the plurality of radiating portions having sequentially reducing widths, a transmission line electrically connected to the radiator, and a pair of ground patterns facing each other with the transmission line interposed therebetween to be physically spaced apart from the radiator and the transmission line. A broadband antenna structure capable of providing a multi-band radiation can be implemented.

15 Claims, 9 Drawing Sheets

ANTENNA STRUCTURE INCLUDING A PLURLAITY OF RADIATING PORTIONS

CROSS-REFERENCE TO RELATED APPLICATION AND CLAIM OF PRIORITY

This application claims the benefit under 35 USC § 119 of Korean Patent Application No. 10-2022-0031974 filed on Mar. 15, 2022 in the Korean Intellectual Property Office (KIPO), the entire disclosures of which are incorporated by reference herein.

BACKGROUND

1. Field

The present invention relates to an antenna structure. More particularly, the present invention relates to an antenna structure including an antenna unit operable in a plurality of frequency bands.

2. Description of the Related Art

As information technologies have been developed, a wireless communication technology such as Wi-Fi, Bluetooth, etc., is combined or embedded in an image display device, an electronic device, an architecture, etc.

As mobile communication technologies have been rapidly developed, an antenna capable of operating a high frequency or ultra-high frequency communication is being applied to public transportations such as a bus and a subway, a building structure, and various mobile devices.

Accordingly, implementation of radiation properties in a plurality of frequency bands from a single antenna device may be needed. In this case, a high frequency antenna and a low frequency antenna may be included in a single device.

However, if antennas of different frequency bands are disposed to be adjacent to each other, radiation and impedance characteristics of the different antennas may collide with each other and may be disturbed.

Further, when the antennas of different frequency bands are arranged to be separated from each other, a space for the arrangement of the antennas may be increased to degrade spatial efficiency and aesthetic properties of a structure to which an antenna device is applied.

For example, Korean Published Patent Application No. 2019-0009232 discloses an antenna module integrated into a display panel. However, a broadband antenna with improved radiation reliability is not disclosed.

SUMMARY

According to an aspect of the present invention, there is provided an antenna structure having improved radiation property and reliability.

(1) An antenna structure, including: a radiator including a plurality of radiating portions integrally connected to each other, the plurality of radiating portions having sequentially reducing widths; a transmission line electrically connected to the radiator; and a pair of ground patterns facing each other with the transmission line interposed therebetween to be physically spaced apart from the radiator and the transmission line.

(2) The antenna structure according to the above (1), wherein the plurality of radiating portions include a first radiating portion, a second radiating portion and a third radiating portion, widths of which are sequentially reduced.

(3) The antenna structure according to the above (2), wherein the radiator has a first recess formed at a boundary between the first radiating portion and the second radiating portion, and a second recess formed at a boundary between the second radiating portion and the third radiating portion.

(4) The antenna structure according to the above (2), wherein the first radiating portion, the second radiating portion and the third radiating portion are arranged in a stepped shape.

(5) The antenna structure according to the above (2), wherein the transmission line is directly connected to the third radiating portion.

(6) The antenna structure according to the above (2), wherein a length of the first radiating portion, a length of the second radiating portion and a length of the third radiating portion are different from each other.

(7) The antenna structure according to the above (2), wherein a length of the first radiating portion, a length of the second radiating portion and a length of the third radiating portion are sequentially decreased.

(8) The antenna structure according to the above (2), wherein an average resonance frequency of the second radiating portion is greater than an average resonance frequency of the first radiating portion.

(9) The antenna structure according to the above (2), wherein an average resonance frequency of the third radiating portion is greater than an average resonance frequency of the second radiating portion.

(10) The antenna structure according to the above (2), wherein the pair of ground patterns serve as a fourth radiating portion.

(11) The antenna structure according to the above (10), wherein an average resonance frequency of the fourth radiating portion is greater than an average resonance frequency of the third radiating portion.

(12) The antenna structure according to the above (1), wherein each lateral side of the radiating portions has a straight line shape.

(13) The antenna structure according to the above (12), wherein the each lateral side of the radiating portions is parallel to the transmission line.

(14) The antenna structure according to the above (1), wherein at least one of the pair of ground patterns include a protrusion.

(15) The antenna structure according to the above (14), each of the pair of ground patterns includes the protrusion.

(16) The antenna structure according to the above (15), wherein each of the pair of ground patterns includes a ground portion extending in a width direction around the transmission line, and the protrusion extends from the ground portion toward the radiator in an extension direction of the transmission line.

(17) The antenna structure according to the above (1), wherein the radiator includes a mesh structure.

(18) The antenna structure according to the above (17), further including a dummy mesh pattern disposed around the radiator and spaced apart from the radiator.

According to embodiments of the present invention, an antenna unit included in an antenna structure may include a plurality of radiating portions, widths of which may be sequentially reduced. Thus, a multi-band antenna capable of providing a multi-band signal transmission/reception may be implemented in a single radiator.

In exemplary embodiments, the antenna unit may include a ground pattern being physically separated from the radiator and including a protrusion. The ground pattern may serve as an auxiliary radiator. For example, a radiation of a high frequency band may be added by the ground pattern through a coupling with the radiator and/or the transmission line.

An electrical coupling between the ground pattern and the radiator and/or the transmission line may be promoted through the protrusion. Accordingly, independence of the high-frequency band radiation and driving reliability may be improved.

DETAILED DESCRIPTION OF THE EMBODIMENTS

According to exemplary embodiments of the present invention, an antenna structure providing a radiation of a plurality of resonance frequency bands from a single antenna unit is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
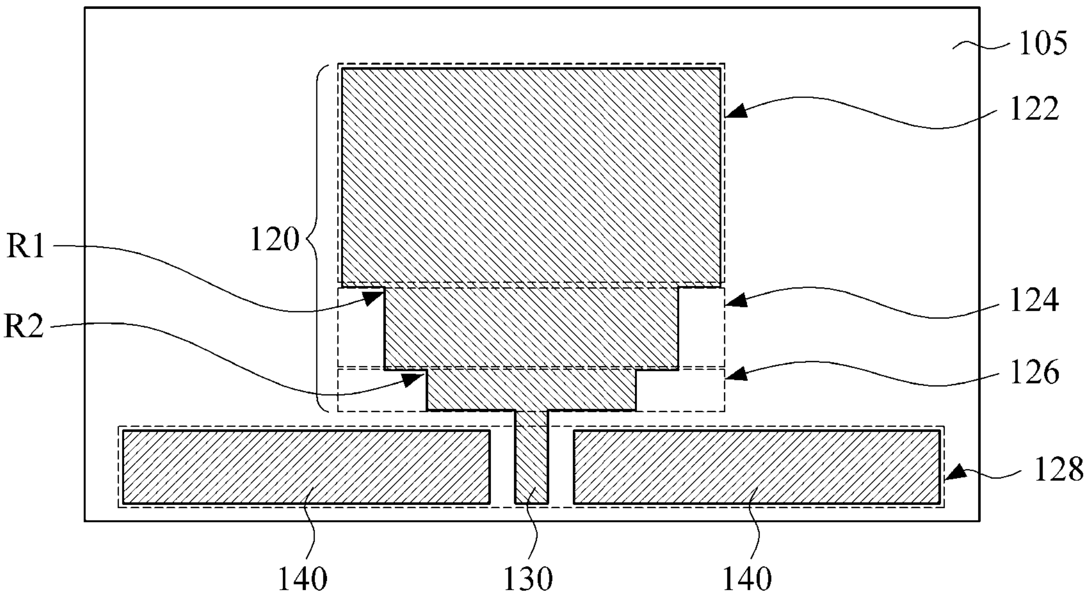
FIGS. 1 and 2 are a schematic plan view and a schematic cross-sectional view, respectively, illustrating an antenna structure in accordance with exemplary embodiments.
Figure 2:
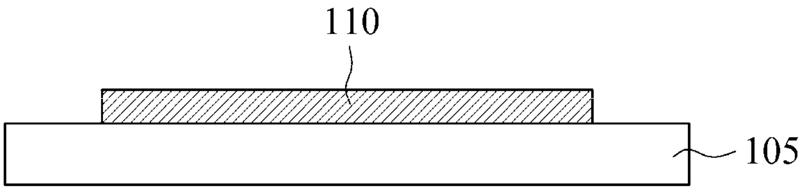

FIGS. 1 and 2 are a schematic plan view and a schematic cross-sectional view, respectively, illustrating an antenna structure in accordance with exemplary embodiments. For convenience of descriptions, detailed illustration of construction/structure of the antenna unit 110 is omitted in FIG. 2.

The antenna structure may include a dielectric layer 105 and an antenna unit 110 formed on the dielectric layer 105.

The dielectric layer 105 may include, e.g., a transparent resin material. For example, the dielectric layer 105 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or an acrylic urethane-based resin; a silicone-based resin, etc. These may be used alone or in a combination thereof.

An adhesive film such as an optically clear adhesive (OCA), an optically clear resin (OCR), or the like may be included in the dielectric layer 105.

In an embodiment, the dielectric layer 105 may include an inorganic insulating material such as glass, silicon oxide, silicon nitride, silicon oxynitride, etc.

In an embodiment, the dielectric layer 105 may be provided as a substantially single layer.

In an embodiment, the dielectric layer 105 may have a multi-layered structure of at least two layers. For example, the dielectric layer 105 may include a substrate layer and an antenna dielectric layer, and may include an adhesive layer between the substrate layer and the antenna dielectric layer.

Impedance or inductance for the antenna unit 110 may be generated by the dielectric layer 105, so that a frequency band at which the antenna structure may be driven or operated may be adjusted. In some embodiments, a dielectric constant of the dielectric layer 105 may be adjusted in a range from about 1.5 to about 12. When the dielectric constant exceeds about 12, a driving frequency may be excessively decreased, so that driving in a desired high frequency band may not be implemented.

The antenna unit 110 may include a radiator 120 and a transmission line 130 electrically connected to the radiator 120. In exemplary embodiments, the antenna unit 110 may include a ground pattern 140 disposed around the transmission line 130 to be physically separated from the radiator 120 and the transmission line 130.

In exemplary embodiments, the radiator 120 may include a plurality of radiating portions, widths of which may be sequentially decreased. Accordingly, a multi-band antenna in which a multi-band signal transmission/reception is performed may be implemented in the single radiator The term "width" as used herein may refer to a length of the radiator 120 in a horizontal direction in FIGS. 1, 3 to 6, and 11.

In some embodiments, the plurality of radiating portions may include a first radiating portion 122, a second radiating portion 124 and a third radiating portion 126, and widths of the first radiating portion 122, the second radiating portion 124 and the third radiating portion 126 may be sequentially reduced. In a plan view, the third radiating portion 126, the second radiating portion 124 and the first radiating portion 122 may be sequentially disposed from the transmission line 130.

The first radiating portion 122 may correspond to an uppermost or an outermost portion in a length direction of the antenna unit 110 from the transmission line 130 in the plan view.

The first radiating portion 122 may be provided as a low frequency radiator of the radiator 120 or the antenna unit 110. For example, radiation of the lowest frequency band obtained by the antenna unit 110 may be implemented from the first radiating portion 122. For example, a resonance frequency of the first radiating portion 122 may be in a range from about 0.1 GHz to 1.4 GHz.

In an embodiment, a radiation band corresponding to an LTE1 band may be obtained from the first radiating portion 122. In an embodiment, the resonance frequency of the first radiating portion 122 may be in a range from 0.5 GHz to 1 GHz, or from 0.6 GHz to 1 GHz.

The second radiating portion 124 may serve as a first mid-band radiator of the antenna unit 110 or the radiator 120. For example, an average resonance frequency of the second radiating portion 124 may be greater than that of the first radiating portion 122. For example, the resonance frequency of the second radiating portion 124 may be in a range from about 1.5 GHz to 2.5 GHz.

In an embodiment, a radiation band corresponding to an LTE2 band may be obtained from the second radiating portion 124. For example, the resonance frequency of the second radiating portion 124 may be in a range from 1.7 GHz to 2.0 GHz.

For example, the resonance frequency range of the second radiating portion 124 may partially overlap the resonance frequency range of the third radiating portion 126.

In some embodiments, the second radiating portion 124 may have a smaller width than that of the first radiating portion 122.

In some embodiments, a first recess R1 may be formed at a boundary between the first radiating portion 122 and the second radiating portion 124. The recessed boundary may be formed, so that independent radiation properties of the first radiating portion 122 and the second radiating portion 124 may be enhanced. For example, the above-described low-frequency band radiation from the first radiator 122 may be prevented from disturbing the first mid-band radiation from the second radiating portion 124.

The third radiating portion 126 may serve as a second mid-band radiator having a higher resonance frequency range than that of the second radiator 124 of the antenna unit 110 or the radiator 120. For example, a resonance frequency of the third radiating portion 126 may be in a range from about 2.0 GHz to 3.0 GHz.

In an embodiment, a radiation band corresponding to an LTE2 band/2.4 GHz Wi-Fi band may be obtained from the third radiating portion 126. For example, the resonance frequency of the third radiating portion 126 may be in a range from about 2.2 GHz to 2.7 GHz.

For example, the resonance frequency range of the third radiating portion 126 may partially overlap the resonance frequency range of the second radiating portion 124.

In some embodiments, the third radiating portion 126 may have a smaller width than that of each of the first radiating portion 122 and the second radiating portion 124.

In some embodiments, a second recess R2 may be formed at a boundary between the second radiating portion 124 and the third radiating portion 126. Independence and reliability of radiation through the third radiating portion 126 may be improved by the second recess R2.

In some embodiments, the transmission line 130 may be directly connected to the third radiating portion 126.

The transmission line 130 may transmit, e.g., a driving signal or power from a driving integrated circuit (IC) chip to the radiator 120.

For example, one end portion of the transmission line 130 may be directly connected to the third radiating portion 126 to transmit the signal and power to the radiator 120. The other end portion of the transmission line 130 may be electrically connected to the driving IC chip through, e.g., an antenna cable. Accordingly, the signal transmission and reception and the power supply from the driving IC chip to the radiator 120 may be performed.

In some embodiments, the first radiating portion 122, the second radiating portion 124 and the third radiating portion 126 may be arranged in a stepped shape. Thus, independence of a driving frequency band of each radiating portion may be improved.

In some embodiments, each lateral side of the radiating portions 122, 124 and 126 may have a straight line shape. For example, each of the first radiating portion 122, the second radiating portion 124 and the third radiating portion 126 may have a rectangular shape. Accordingly, a signal transmission between the radiating portions may be implemented while suppressing impedance disturbance. Additionally, a desired frequency band may be easily adjusted.

In an embodiment, all sides of the radiator 120 may have a straight line shape.

In some embodiments, the lateral sides of the radiating portions 122, 124 and 126 may have a straight line shape parallel to the transmission line 130. Thus, a signal efficiency may be increased by reducing a distance of the signal transmission/reception.

In some embodiments, a length of the first radiating portion 122, a length of the second radiating portion 124 and a length of the third radiating portion 126 may be different from each other. Accordingly, an interval between driving frequency bands of each radiating portion may be modified based on target frequency bands.

In some embodiments, the length of the first radiating portion 122, the length of the second radiating portion 124 and the length of the third radiating portion 126 may be sequentially decreased. In this case, an interval between the driving frequency ranges of the radiating portions may become wider. For example, a band between the driving frequency ranges of the first radiating portion 122 and the second radiating portion 124 may become wider, and a band between the driving frequency range of the second radiating portion 124 and the third radiating portion 126 may become wider. Accordingly, interference and disturbance between the driving frequency ranges may be prevented, and a resolution in each driving frequency range may be improved.

The term "length" as used herein may refer to a length in a longitudinal direction perpendicular to the horizontal direction of the radiator 120 in FIGS. 1, 3 to 6, and 11.

In exemplary embodiments, the ground pattern 140 may be disposed around the transmission line 130 and may be spaced apart from the radiator 120 and the transmission line 130. For example, a pair of the ground patterns 140 may be disposed to face each other with the transmission line 130 interposed therebetween.

In some embodiments, the ground pattern 140 may serve as an auxiliary radiator. For example, the ground pattern 140 may be electrically coupled to the radiator 120 and/or the transmission line 130 to serve as a fourth radiating portion 128.

The fourth radiating portion 128 may provide a high frequency radiation region of the antenna unit 110. For example, a radiation of the highest frequency band obtained by the antenna unit 110 may be implemented from the fourth radiating portion 128. For example, a resonance frequency of the fourth radiating portion 128 may be in a range from about 3.0 GHz to about 5.0 GHz.

In an embodiment, a radiation band corresponding to Sub-6 5G may be obtained from the fourth radiating portion 128. In an embodiment, a resonance frequency of the fourth radiating portion 128 may be in a range from about 3 GHz to 4 GHz or from about 3.1 GHz to 3.8 GHz.

An average resonance frequency of the fourth radiating portion 128 may be greater than that of the third radiating portion 128.

The above-described driving frequency bands of the first radiating portion 122, the second radiating portion 124, the third radiating portion 126 and the fourth radiating portion 128 are exemplary, and may be modified according to radiation properties of the antenna unit 110.

For example, a size/area of the radiator 120 may be adjusted according to the target frequency band. For example, the driving frequency band may be shifted to a high frequency band by reducing an entire area of the radiator 120. In this case, the first radiating portion 122 may be driven in the radiation band of the above-described second radiating portion 124, and the second radiating portion 124 may be driven in the radiation band of the third radiating portion 126 as described above. Further, the third radiating portion 126 may be driven in the radiation band of the fourth radiating portion 128 as described above, and the fourth radiating portion 128 may be driven in a high-frequency band greater than the radiation band of the fourth radiating portion 128 as described above.

A plurality of the radiating portions having different resonance frequency ranges may be included in one antenna unit 110, so that a multi-band antenna may be achieved while improving spatial efficiency.

In some embodiments, a plurality of the radiators 120 may be arranged on the dielectric layer 105 to form a radiator column and/or a radiator row.

In an embodiment, two radiators 120 may be spaced apart from each other in the width direction of the dielectric layer 105 on the dielectric layer 105.

Figure 3:
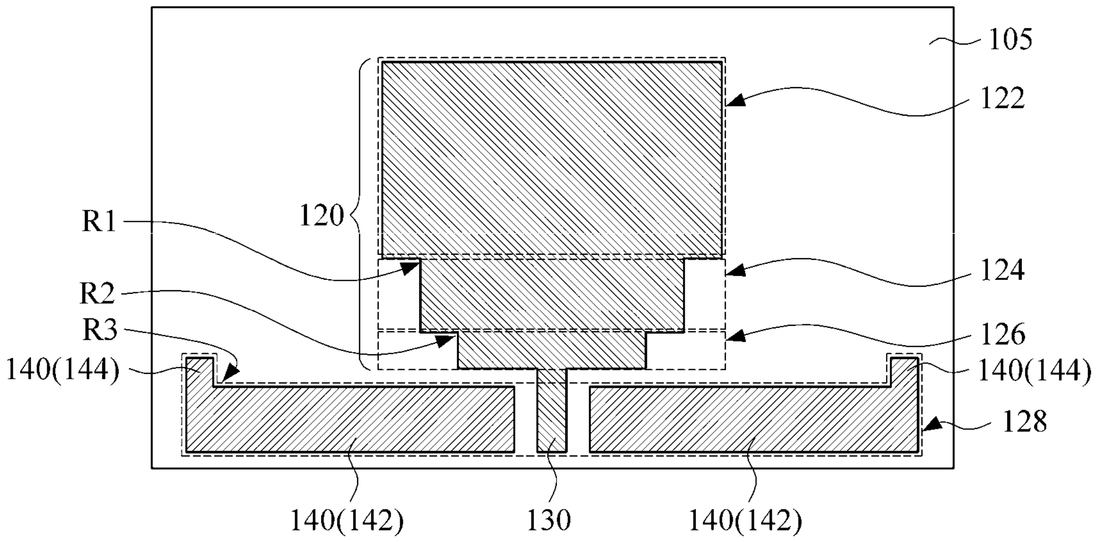
FIG. 3 is a schematic plan view illustrating an antenna structure in accordance with exemplary embodiments.

FIG. 3 is a schematic plan view illustrating an antenna structure in accordance with exemplary embodiments.

Referring to FIG. 3, the ground pattern 140 may include a ground portion 142 extending in the width direction around the transmission line 130.

For example, the ground pattern 140 may include a protrusion 144 extending from the ground portion 142 toward the radiator 120 in an extension direction of the transmission line 130. The protrusion 144 may promote formation of an electrical coupling between the ground pad 140 and the radiator 120 and/or between the ground pad 140 and the transmission line 130. Accordingly, a multi-band antenna structure that performs high-efficiency radiation in the high-frequency band may be formed.

For example, the protrusion 144 and the ground portion 142 may be integrally formed using the same material.

For example, disturbance/interference with the driving frequency of other radiators may be prevented by the protrusion 144. Accordingly, signal loss and disturbance in the radiation band of the fourth radiation unit 128 may be suppressed.

For example, a third recess R3 may be formed at a boundary between the ground portion 142 and the protrusion 144.

The antenna unit 110 may include silver (Ag), gold (Au), copper (Cu), aluminum (Al), platinum (Pt), palladium (Pd), chromium (Cr), titanium (Ti), tungsten (W), and niobium. (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination of two or more therefrom.

In an embodiment, the antenna unit 110 may include silver (Ag) or a silver alloy (e.g., silver-palladium-copper (APC)), or copper (Cu) or a copper alloy (e.g., a copper-calcium (CuCa)) to implement a low resistance and a fine line width pattern.

The antenna unit 110 may include a transparent conductive oxide such indium tin oxide (ITO), indium zinc oxide (IZO), zinc oxide (ZnOx), indium zinc tin oxide (IZTO), etc.

In some embodiments, the antenna unit 110 may include a stacked structure of a transparent conductive oxide layer and a metal layer. For example, the antenna unit 110 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The antenna unit 110 may include a blackened portion, so that a reflectance at a surface of the antenna unit 110 may be decreased to suppress a visual recognition of the antenna unit due to a light reflectance.

In an embodiment, a surface of the metal layer included in the antenna unit 110 may be converted into a metal oxide or a metal sulfide to form a blackened layer. In an embodiment, a blackened layer such as a black material coating layer or a plating layer may be formed on the antenna unit or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

According to the above-described exemplary embodiments, radiation properties of at least three frequency bands may be implemented from the antenna unit 110.

Figure 4:
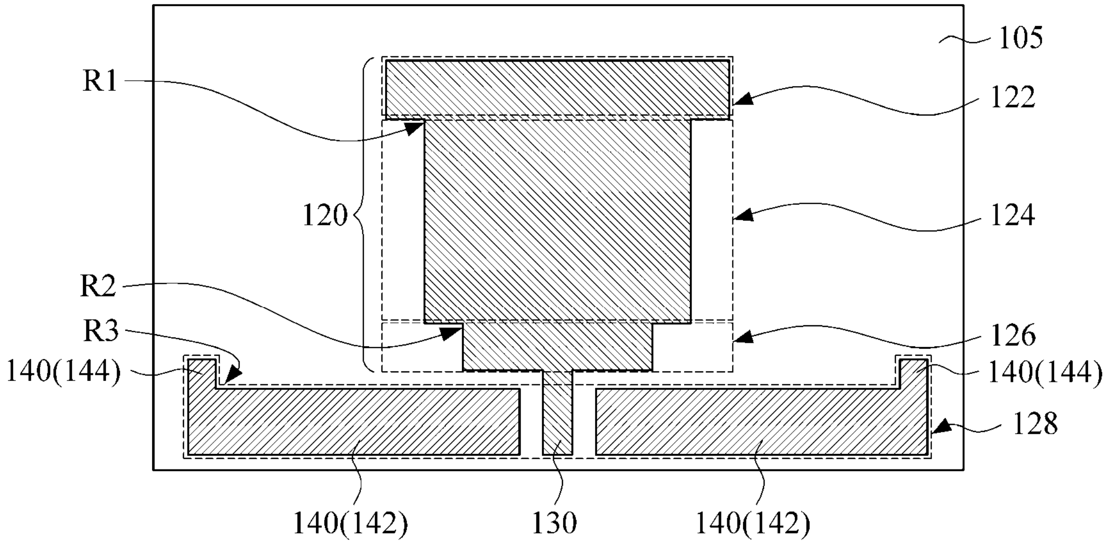
FIGS. 4 and 5 are schematic plan views illustrating an antenna structure in accordance with exemplary embodiments.
Figure 5:
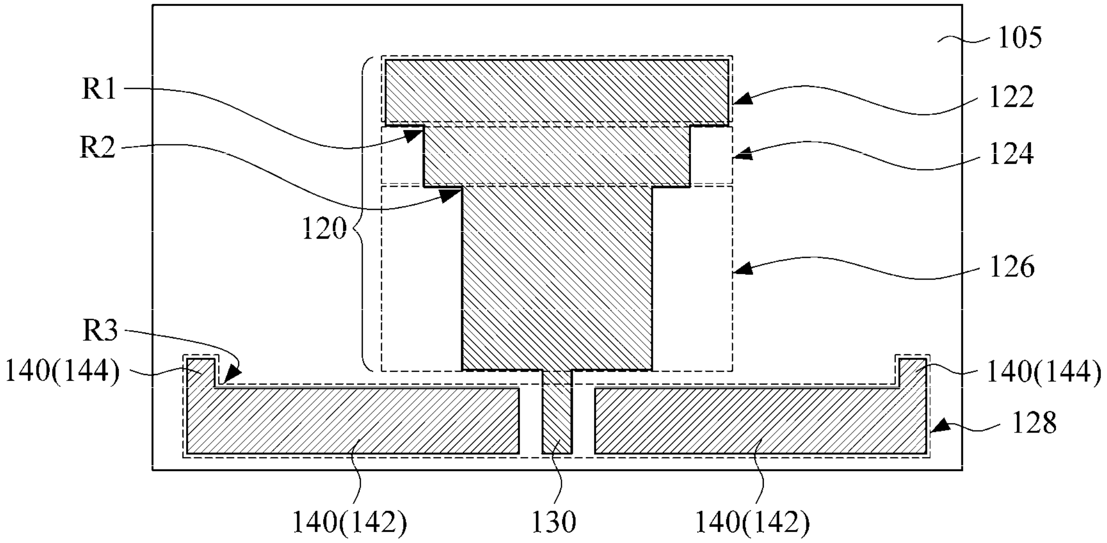

FIGS. 4 and 5 are schematic plan views illustrating an antenna structure in accordance with exemplary embodiments.

Referring to FIGS. 4 and 5, lengths of the first radiating portion 122, the second radiating portion 124 and/or the third radiating portion 126 may be properly changed/adjusted according to the target driving frequency. In exemplary embodiments, the average resonance frequency of the first radiating portion 122 may be smaller than that of the second radiating portion 124, and the average resonance frequency of the second radiating portion 124 may be smaller than that of the third radiating portion 126.

As illustrated in FIG. 4, the length of the second radiating portion 124 may be greater than each length of the first radiating portion 122 and the third radiating portion 126. In this case, the resonance frequency range of the second radiating portion 124 may be shifted in a smaller range.

As illustrated in FIG. 5 the length of the third radiating portion 126 may be greater than each length of the first radiating portion 122 and the second radiating portion 124. In this case, the resonance frequency range of the third radiating portion 126 may be shifted in a smaller range.

Figure 6:
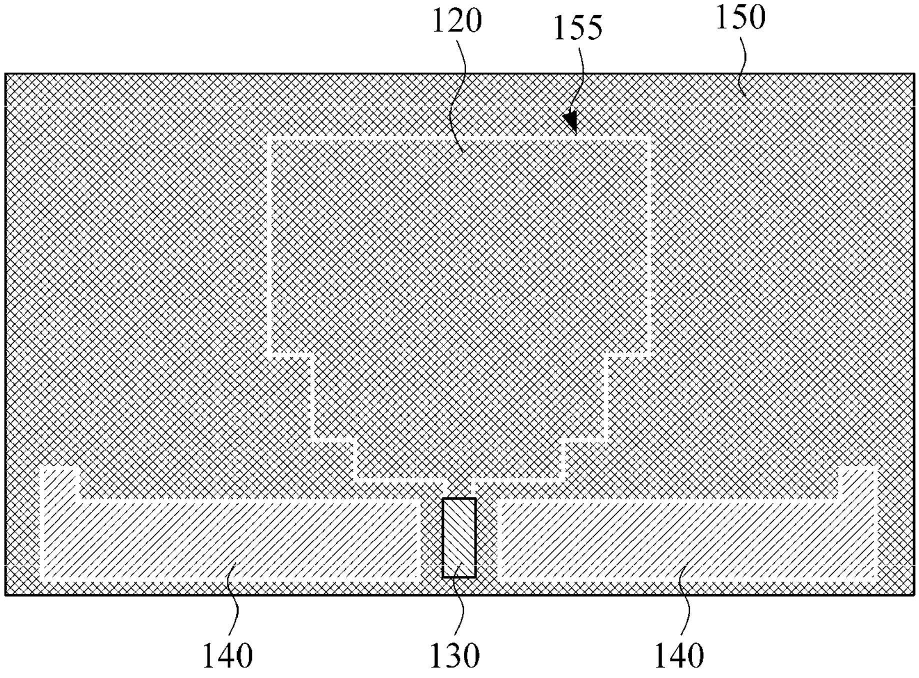
FIG. 6 is a schematic plan view illustrating an antenna structure in accordance with exemplary embodiments.

FIG. 6 is a schematic plan view illustrating an antenna structure in accordance with exemplary embodiments.

Referring to FIG. 6, the antenna structure may further include a dummy mesh pattern 150 disposed around the antenna unit 110. For example, the dummy mesh pattern 150 may be electrically and physically separated from the antenna unit 110 by a separation region 155.

For example, a conductive layer containing the metal or alloy described above may be formed on the dielectric layer 105. A mesh structure may be formed while etching the conductive layer along a circumference profile of the antenna unit 110 as described above. Accordingly, the antenna unit 110 and the dummy mesh pattern 150 spaced apart from each other by the separation region 155 may be formed.

In some embodiments, the antenna unit 110 may also share a mesh structure. Accordingly, transmittance of the antenna unit 110 may be improved, and optical properties around the antenna unit 110 may become uniform by the distribution of the dummy mesh pattern 150. Thus, the antenna unit 110 may be prevented from being visually recognized.

In an embodiment, the antenna unit 110 may entirely include the mesh structure. In an embodiment, at least a portion of the transmission line 130 may include a solid structure for enhancing a feeding efficiency.

In an embodiment, the ground pattern 140 may be applied to various objects as described above. If the ground pattern 140 is disposed in an area of an object that is not visible to a user, the ground pattern 140 may have a solid structure.

The auxiliary radiation through the above-described coupling effect may be promoted through the ground pattern 140.

For example, when the antenna unit 110 is disposed in a non-visible area by a user in an object to which the antenna structure is applied, the antenna unit 110 may include the solid structure.

The dummy mesh pattern 150 may include intersecting conductive lines forming a mesh structure. In some embodiments, the dummy mesh pattern 150 may include segmented regions (not illustrated) where the conductive lines are cut. Accordingly, the radiation properties of the antenna unit 110 may be prevented from being disturbed by the dummy mesh pattern 150.

Figure 7:
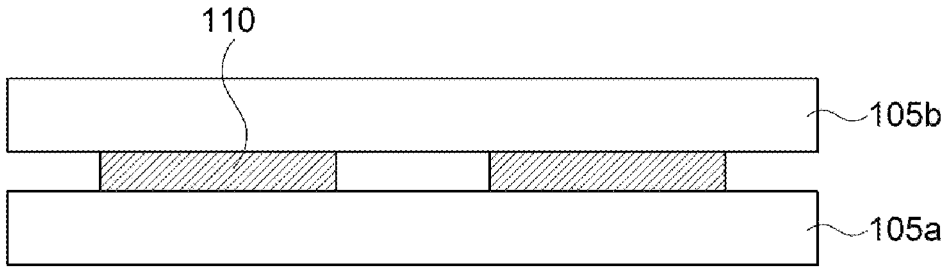
FIG. 7 is a schematic cross-sectional view illustrating an antenna structure in accordance with exemplary embodiments.

FIG. 7 is a schematic cross-sectional view illustrating an antenna structure in accordance with exemplary embodiments.

Referring to FIG. 7, the antenna unit 110 may be disposed between a first dielectric layer **105*a* and a second dielectric layer 105*b*. For example, the antenna unit 110 may be sandwiched or embedded between the first and second dielectric layers 105*a* and 105*b***.

The first and second dielectric layers **105*a* and 105*b* may be disposed above and below the antenna unit 110, so that dielectric and radiation environments around the antenna unit 110** may become uniform.

In some embodiments, the second dielectric layer **105*b* may serve as a coating layer, an insulating layer and/or a protective film of the antenna unit 110** or the antenna structure.

In some embodiments, an antenna structure may include two or more antenna units 110. For example, a plurality of the antenna units 110 may be arranged to form an array. Alternatively, a plurality of antenna units 110 may be arranged without forming an array. Accordingly, an overall gain of the antenna structure may be increased.

Figure 8:
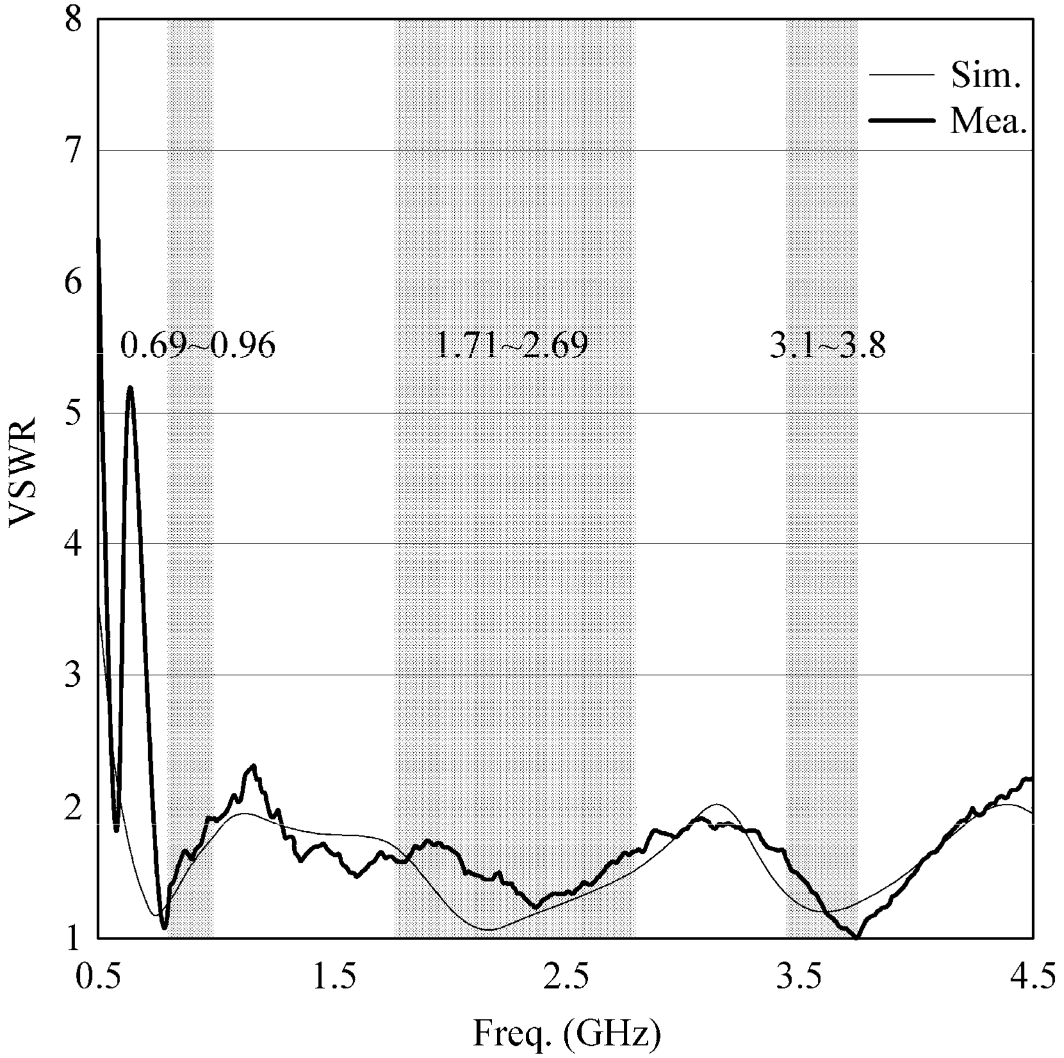
FIG. 8 is a graph showing simulation results and actual measurement results of VSWR using an antenna structure in accordance with exemplary embodiments.

FIG. 8 is a graph showing simulation results (Sim.) and actual measurement results (Mea.) of VSWR (Voltage standing wave ratio) using an antenna structure in accordance with exemplary embodiments. For example, VSWR may represent an impedance matching degree.

Referring to FIG. 8, a multi-band antenna was implemented by one antenna unit manufactured according to an exemplary embodiment. As shown in FIG. 8, resonance frequency ranges of the second radiating portion 124 and the third radiating portion 126 partially overlapped.

Figure 9:
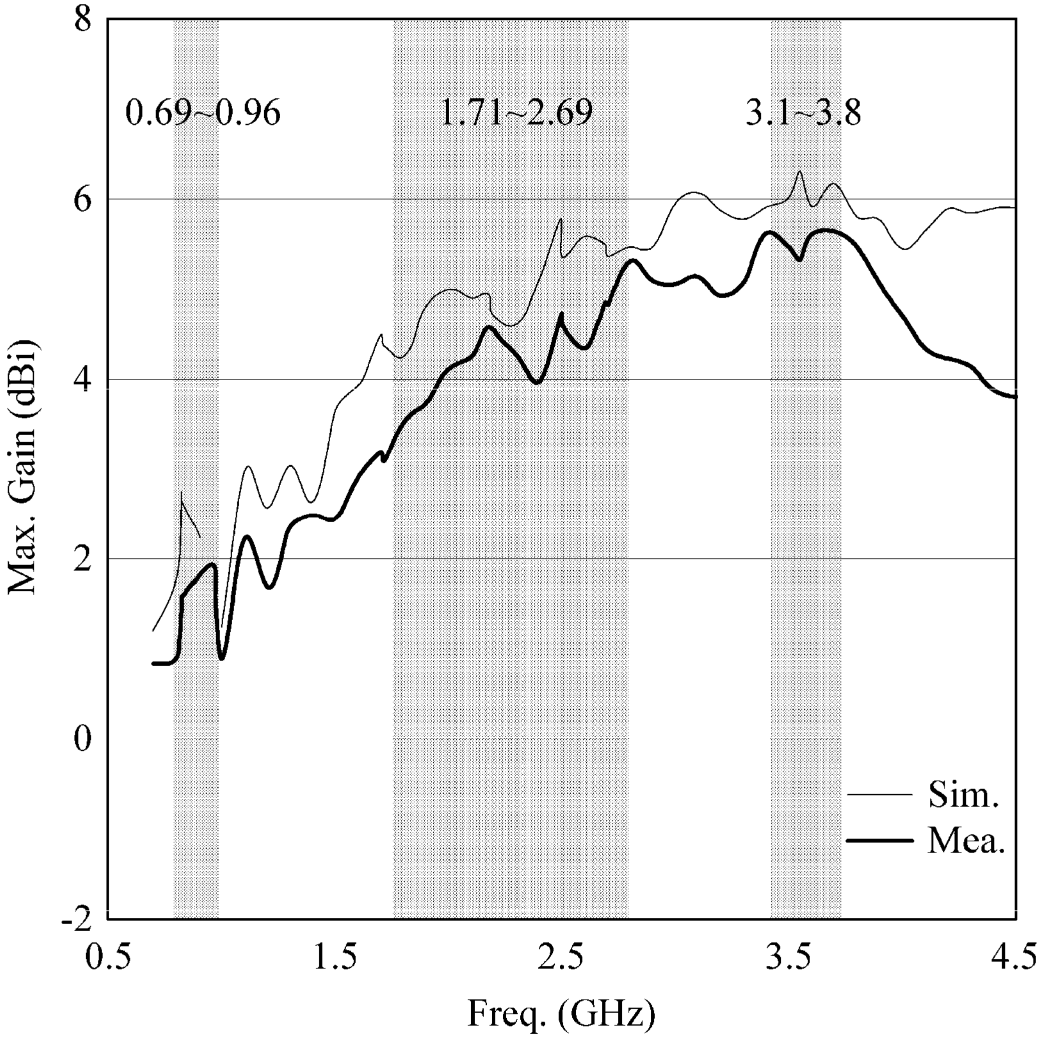
FIGS. 9 and 10 are graphs showing simulation results and actual measurement results of an antenna gain from an antenna structure in accordance with exemplary embodiments.
Figure 10:
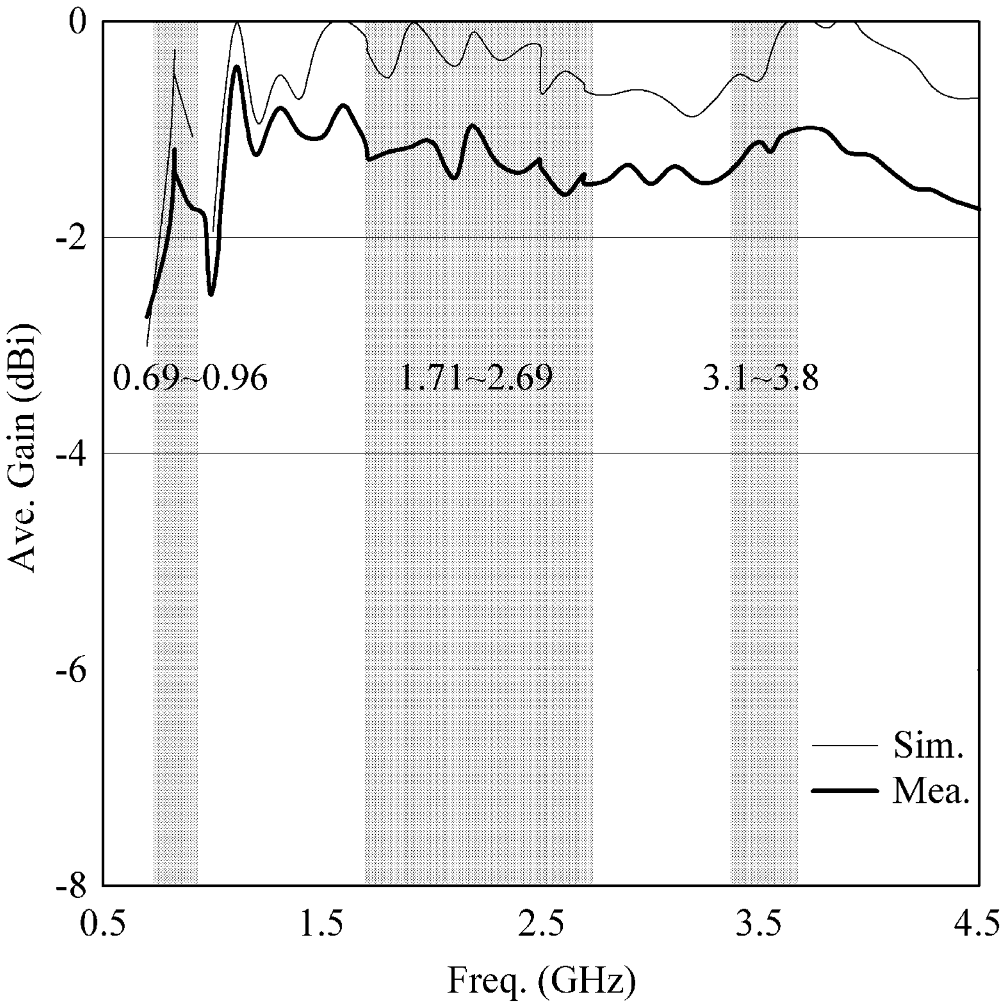

FIGS. 9 and 10 are graphs showing simulation results and actual measurement results of an antenna gain from an antenna structure in accordance with exemplary embodiments.

Specifically, FIG. 9 is a graph showing simulation results (Sim.) and actual measurement results (Mea.) of a maximum antenna gain (Max. gain) from an antenna structure fabricated according to an exemplary embodiment. FIG. 10 is a graph showing simulation results (Sim.) and actual measurement results (Mea.) of an average antenna gain (Ave. gain) from an antenna structure fabricated according to an exemplary embodiment.

Referring to FIGS. 9 and 10, the antenna structure according to the exemplary embodiment including a plurality of radiating portions and having sequentially reduced widths provided enhanced gain values throughout low-frequency and high-frequency bands.

The above-described antenna structure may be applied to various structures and objects such as a window of public transportation such as a bus and a subway, a building, a vehicle, a decorative sculpture, a guidance sign (e.g., a direction sign, an emergency exit sign, an emergency light, etc.), and may serve as a relay antenna structure. The relay antenna structure may include, e.g., an access point (AP) such as a repeater, a router, a small cell, an internet router, etc.

Figure 11:
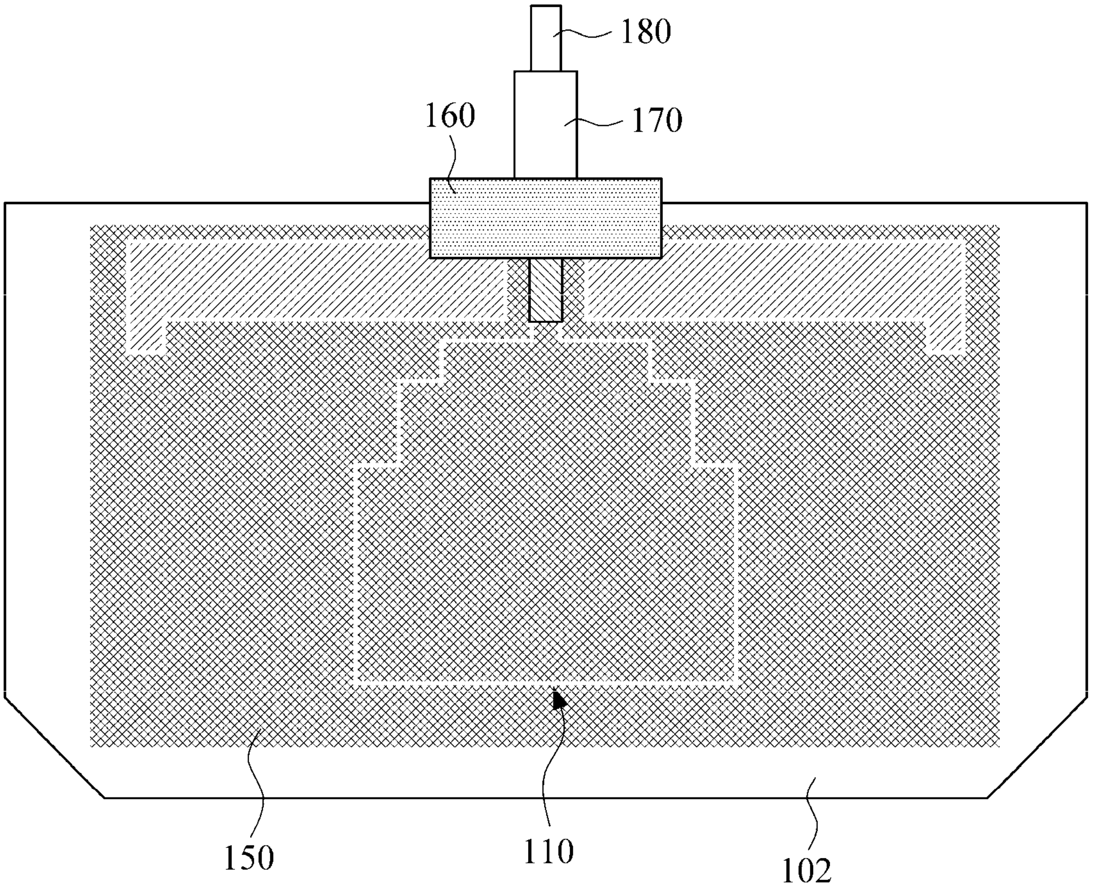
FIGS. 11 and 12 are schematic views illustrating an application of an antenna structure in accordance with exemplary embodiments.
Figure 12:
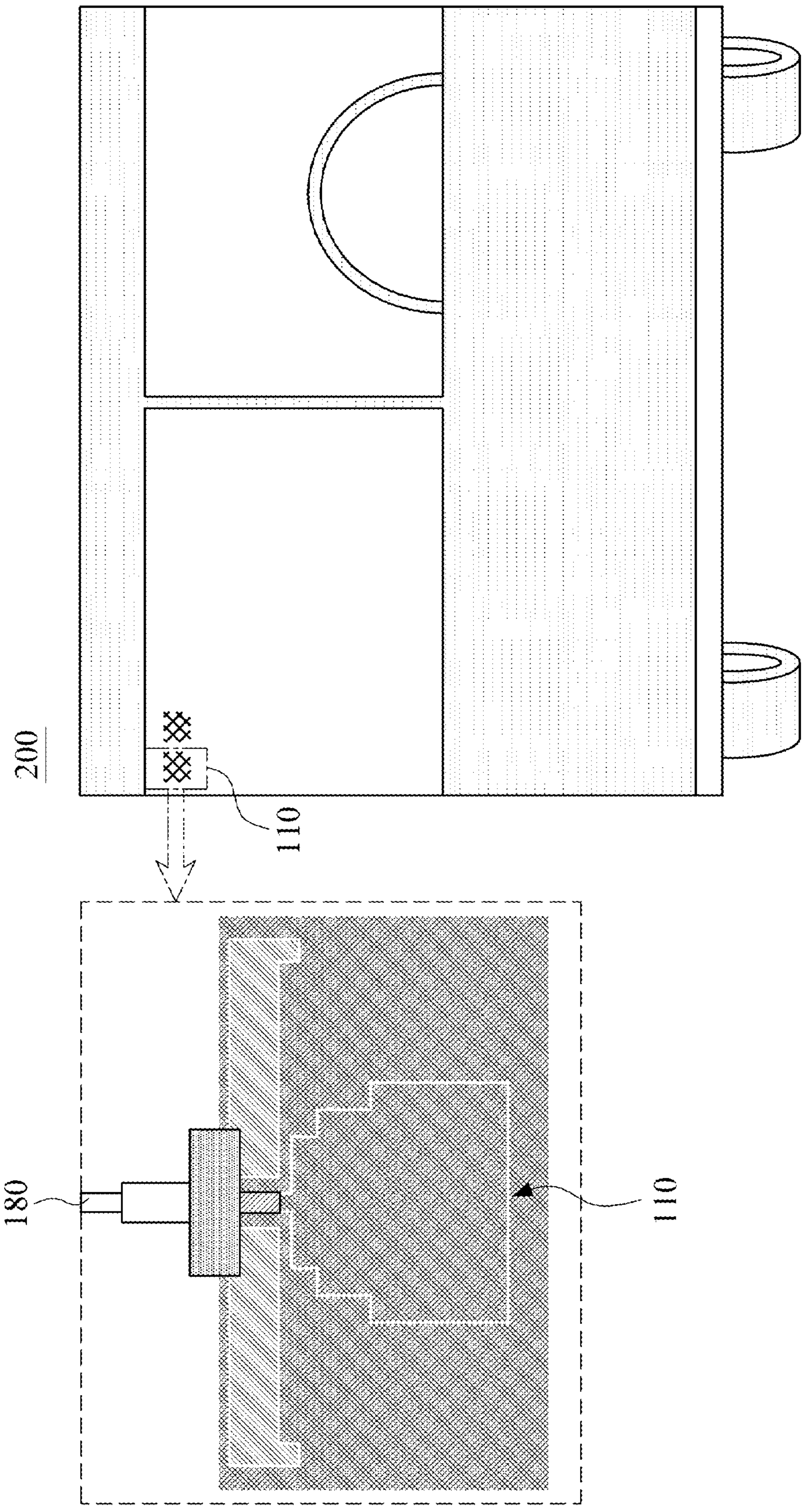

FIGS. 11 and 12 are schematic views illustrating an application of an antenna structure in accordance with exemplary embodiments. For example, FIG. 11 illustrates an antenna structure provided as a relay antenna structure. For example, FIG. 12 is a schematic diagram illustrating a router construction in which the relay antenna structure of FIG. 11 is attached to a target object 200 (e.g., a public transportation such as a bus or subway).

Referring to FIGS. 11 and 12, the antenna structure may have a structure that may be fixed to a window of public transportation, a wall or a ceiling of a building structure, a window, a vehicle, a sign, etc. For example, the above-described antenna unit 110 may be inserted into or attached to a substrate 102.

For example, the substrate 102 may serve as the dielectric layer 105 as illustrated in FIG. 1. As described with reference to FIG. 7, the first dielectric layer **105*a* and the second dielectric layer 105*b* may be provided together as the substrate 102, and the antenna unit 110 may be buried in the substrate 102. The substrate 102** may serve as public transport windows, a building, various decorative structures, an instruction sign, a window, etc.

In some embodiments, the above-described antenna structure may be attached to the substrate 102 in the form of a film.

In some embodiments, as described above, the dummy mesh pattern 150 may be formed around the antenna unit 110 to reduce or prevent a visual recognition of the antenna unit 110. At least a portion of the antenna unit 110 may also have a mesh pattern structure.

For example, a first fixing portion 160 may be coupled to one side of the substrate 102 and coupled to a feeding portion of the transmission line 130. The first fixing portion 160 may have, e.g., a clamp shape.

A second fixing portion 170 may be included in the antenna structure, and may be inserted into, e.g., a wall or a ceiling to fix the antenna structure. The second fixing portion 170 may have, e.g., a screw shape.

An antenna cable 180 may be inserted into the second fixing portion 170 and the first fixing portion 160 to supply a power to a feeding portion of the antenna unit 110.

For example, the antenna cable 180 may be buried in a public transportation such as a bus or subway, an object 200 such as an inner wall of a building, a window, a sign, etc., and may be coupled with an external power source, an integrated circuit chip, or an integrated circuit board. Accordingly, the power may be supplied to the antenna unit 110 and an antenna radiation may be performed.

As illustrated in FIG. 12, the above-described antenna unit 110 may be attached to the object 200 (e.g., a window of public transportation such as a bus or subway) and may be electrically connected to a Wi-Fi repeater in the public transportation through an antenna cable. Accordingly, a multi-band wireless communication network may be implemented within the public transportation.

What is claimed is:

1. An antenna structure comprising:

a radiator comprising a plurality of radiating portions integrally connected to each other, the plurality of radiating portions having sequentially reducing widths;

a transmission line electrically connected to the radiator; and a pair of ground patterns facing each other with the transmission line interposed therebetween to be physically spaced apart from the radiator and the transmission line, wherein the plurality of radiating portions comprise a first radiating portion, a second radiating portion and a third radiating portion, widths of which are sequentially reduced, each of the pair of ground patterns serves as a fourth radiating portion, and an average resonance frequency of each of the pair of ground patterns is greater than an average resonance frequency of the third radiating portion.

2. The antenna structure according to claim 1, wherein the radiator has a first recess formed at a boundary between the first radiating portion and the second radiating portion, and a second recess formed at a boundary between the second radiating portion and the third radiating portion.

3. The antenna structure according to claim 1, wherein the first radiating portion, the second radiating portion and the third radiating portion are arranged in a stepped shape.

4. The antenna structure according to claim 1, wherein the transmission line is directly connected to the third radiating portion.

5. The antenna structure according to claim 1, wherein a length of the first radiating portion, a length of the second radiating portion and a length of the third radiating portion are different from each other.

6. The antenna structure according to claim 1, wherein a length of the first radiating portion, a length of the second radiating portion and a length of the third radiating portion are sequentially decreased.

7. The antenna structure according to claim 1, wherein an average resonance frequency of the second radiating portion is greater than an average resonance frequency of the first radiating portion.

8. The antenna structure according to claim 1, wherein an average resonance frequency of the third radiating portion is greater than an average resonance frequency of the second radiating portion.

9. The antenna structure according to claim 1, wherein each lateral side of the radiating portions has a straight line shape.

10. The antenna structure according to claim 9, wherein the each lateral side of the radiating portions is parallel to the transmission line.

11. The antenna structure according to claim 1, wherein at least one of the pair of ground patterns comprises a protrusion.

12. The antenna structure according to claim 11, each of the pair of ground patterns comprises the protrusion.

13. The antenna structure according to claim 12, wherein each of the pair of ground patterns comprises a ground portion extending in a width direction around the transmission line, and the protrusion extends from the ground portion toward the radiator in an extension direction of the transmission line.

14. The antenna structure according to claim 1, wherein the radiator includes a mesh structure.

15. The antenna structure according to claim 14, further comprising a dummy mesh pattern disposed around the radiator and spaced apart from the radiator.

* * * * *